US012473922B2

(12) United States Patent
Tiller et al.

(10) Patent No.: US 12,473,922 B2
(45) Date of Patent: Nov. 18, 2025

(54) METHOD FOR OPERATING A PUMP ASSEMBLY (71) Applicant: GKN Sinter Metals Engineering GmbH, Radevormwald (DE)

(72) Inventors: Stefan Tiller, Sankt Augustin (DE); Nils Bornemann, Bonn (DE); Hong Giang To, Düsseldorf (DE)

(73) Assignee: GKN Sinter Metals Engineering GmbH, Radevormwald (DE)

( * ) Notice: Subject to any disclaimer, the term of this patent is extended or adjusted under 35 U.S.C. 154(b) by 94 days.

(21) Appl. No.: 16/978,540

(22) PCT Filed: Mar. 6, 2019

(86) PCT No.: PCT/EP2019/055559
§ 371 (c)(1),
(2) Date: Sep. 4, 2020

(87) PCT Pub. No.: WO2019/170736
PCT Pub. Date: Sep. 12, 2019

(65) Prior Publication Data
US 2021/0017997 A1  Jan. 21, 2021

(30) Foreign Application Priority Data
Mar. 6, 2018 (DE) ...................... 10 2018 105 136.0

(51) Int. Cl.
*F04D 13/08* (2006.01)
*F04D 15/00* (2006.01)
(Continued)

(52) U.S. Cl.
CPC ......... *F04D 13/08* (2013.01); *F04D 15/0066* (2013.01); *F04D 29/588* (2013.01); *F04D 7/00* (2013.01); *F04D 29/043* (2013.01)

(58) Field of Classification Search
CPC ...... F04D 13/08; F04D 15/006; F04D 29/588; F04D 7/00; F04D 29/043
(Continued)

(56) References Cited

U.S. PATENT DOCUMENTS

| 4,135,122 A | 1/1979 | Holmquist et al. |
| 5,896,021 A * | 4/1999 | Kumar .................... H02P 29/62 |
| | | 318/471 |

(Continued)

FOREIGN PATENT DOCUMENTS

| CN | 103190073 A | 7/2013 |
| CN | 104753396 A | 7/2015 |

(Continued)

OTHER PUBLICATIONS

PCT International Search Report and Written Opinion, PCT/EP2019/055559, May 15, 2019, 21 pages.
(Continued)

*Primary Examiner* — Connor J Tremarche
(74) *Attorney, Agent, or Firm* — Quarles & Brady LLP (57) ABSTRACT

A method for operating a pump assembly, wherein the pump assembly has at least one first drive means for conveying a fluid and an electric motor for driving the first drive means, the electric motor comprising at least one stator and one rotor, the rotor being connected at least to the first drive means via a driveshaft. The electric motor draws power at least: i. in order to heat the rotor by means of induction; or ii. in order to drive the rotor, the driveshaft and the first drive means so that these components rotate about a common rotation axis at a speed of more than "0" revolutions per minute.

16 Claims, 4 Drawing Sheets

(51) Int. Cl.
 *F04D 29/58* (2006.01)
 *F04D 7/00* (2006.01)
 *F04D 29/043* (2006.01)

(58) Field of Classification Search
 USPC ...................................................... 417/410.1
 See application file for complete search history.

(56) References Cited

U.S. PATENT DOCUMENTS

| | | | |
|---|---|---|---|
| 6,642,682 B1 | 11/2003 | Perkins et al. | |
| 8,944,786 B1* | 2/2015 | McDougall | F04D 13/024 |
| | | | 417/420 |
| 2004/0018104 A1* | 1/2004 | Watkins | A01K 63/047 |
| | | | 417/423.3 |
| 2005/0168089 A1* | 8/2005 | Miyashita | H02K 29/03 |
| | | | 310/156.57 |
| 2005/0241312 A1 | 11/2005 | Hata et al. | |
| 2011/0315677 A1* | 12/2011 | Suominen | H05B 6/102 |
| | | | 219/660 |
| 2012/0211093 A1 | 8/2012 | Grimes | |
| 2013/0108488 A1 | 5/2013 | Chien et al. | |
| 2015/0214817 A1* | 7/2015 | Kim | H02K 9/197 |
| | | | 310/54 |
| 2016/0186633 A1* | 6/2016 | Müller | F01N 3/2896 |
| | | | 29/611 |
| 2016/0233814 A1 | 8/2016 | Okamoto et al. | |
| 2016/0322869 A1* | 11/2016 | Takezaki | H02K 1/27 |
| 2017/0302145 A1 | 10/2017 | Holenstein et al. | |
| 2017/0311391 A1 | 10/2017 | Bardin et al. | |
| 2017/0363050 A1* | 12/2017 | Graf | H02K 23/66 |
| 2019/0036399 A1* | 1/2019 | Yamada | H02K 3/28 |

FOREIGN PATENT DOCUMENTS

| | | |
|---|---|---|
| CN | 105429328 A | 3/2016 |
| CN | 105612348 A | 5/2016 |
| CN | 107302294 A | 10/2017 |
| DE | 2822767 A1 | 12/1978 |
| DE | 102016103051 A1 | 8/2017 |
| JP | 2007120328 A | 5/2007 |
| WO | 2016066714 A2 | 5/2016 |
| WO | 2016102257 A1 | 6/2016 |

OTHER PUBLICATIONS

The State Intellectual Property Office of People's Republic of China, The First Office Action and Search Report, Application No. 201980030844.1, Jan. 26, 2024, 20 pages.

* cited by examiner

METHOD FOR OPERATING A PUMP ASSEMBLY

This application represents the U.S. national stage entry of International Application No. PCT/EP2019/055559 filed Mar. 6, 2019, which claims priority to German Patent Application No. 10 2018 105 136.0 filed Mar. 6, 2018, the disclosure of which is incorporated herein by reference in its entirety and for all purposes.

The present invention relates to a method for operating a pump assembly, wherein the pump assembly has a first drive means for conveying a fluid and an electric motor for driving the first drive means, wherein the electric motor comprises at least one stator as well as one rotor, wherein the rotor by way of a drive shaft is connected at least to the first drive means. The pump assembly is in particular a conveying installation for a water/urea solution (available under the AdBlue® trademark, for example) which is preferably used for treating exhaust gas of an internal combustion engine in a motor vehicle.

Such pump assemblies for water/urea solutions have been known for a long time. An electric motor herein is usually connected to the drive shaft of the drive means. The drive means for conveying a fluid is driven by way of the drive shaft of such rotary pumps. For example, gear rotors (in gear pumps) are known as drive means. A pump assembly of an ideally compact construction is to be provided specifically for the use in motor vehicles. It is furthermore to be taken into account when conveying water/urea solutions that freezing of the solution in the lines is ideally avoided and that frozen fluid can be thawed and thus rendered conveyable as fast as possible again.

Proceeding therefrom it is an object of the present invention to at least alleviate or even solve the issues set forth with reference to the prior art. In particular, a method for operating a pump assembly by way of which a targeted thermal input into the fluid is possible is to be proposed.

In order for said objects to be achieved, a method according to the features of patent claim 1 is proposed. Advantageous embodiments are the subject matter of the dependent patent claims. The features set forth individually in the patent claims can be combined with one another in a technologically expedient manner and can be enhanced by explanatory circumstances from the description and details from the figures, wherein further variants of embodiment of the invention are demonstrated.

Proposed is a method for operating a pump assembly, wherein the pump assembly has at least one first drive means for conveying a fluid and an electric motor for driving the first drive means. The electric motor comprises at least one stator as well as one rotor, wherein the rotor by way of a drive shaft is connected at least to the first drive means. A power input of the electric motor at least for heating the rotor takes place by means of induction.

Furthermore proposed is a method for operating an electric motor. The electric motor comprises at least one stator as well as one rotor. A power input of the electric motor at least for heating the rotor takes place by means of induction.

The following explanations relate in particular to both methods (method for operating a pump assembly and method for operating an electric motor).

In particular, the power input of the electric motor (temporarily or in pre-definable periods, respectively) takes place exclusively for heating the rotor.

Moreover, a power input (temporarily or in pre-definable periods, respectively) can take place additionally or else exclusively for driving the rotor, the drive shaft, and the first drive means such that said components rotate about a common rotation axis at a rotating speed of more than "0" revolutions per minute.

When heating by induction, the heat is created directly in the body (here thus in the rotor) per se, meaning that said heat does not have to be transmitted by thermal conduction. The heating output is readily controllable. For inductive heating, an alternating magnetic field is generated by the stator, or by the coils of the stator, respectively, said alternating magnetic field generating eddy currents in the material of the rotor (for example in the support, see below). Induction heating can also take place through non-conducting materials (a tank wall, for example). The environment is only indirectly heated (in particular by virtue of heat radiation or heat conduction, respectively, emanating from the inductively heated motor).

The method comprises in particular at least the following steps:

a) operating the pump assembly (of the electric motor) in a first state in which the electric motor is driven at an electric first drive output of the electric motor, wherein heating of the rotor (for example by means of induction) takes place by way of an electric first heating output which is at most 10% of the first drive output;

b) operating the pump assembly (of the electric motor) in a second state in which the electric motor is driven at an electric second drive output, wherein heating of the rotor (by means of induction) takes place by way of an electric second heating output which is at least 20% of the second drive output.

The first drive means is preferably a first gear rotor. Said first gear rotor can be embodied as a component part of a gear pump, for example, wherein the gear pump can be constructed as an external gear pump preferably having involute toothing, as an internal gear pump, or else as an annular gear pump, for example as a generated-rotor pump or as a crescent pump. The gear pump can furthermore be a screw-spindle pump.

The pump assembly herein comprises at least one first drive means which is driven by way of the drive shaft. The first drive means by way of a toothing, for example, can interact with further drive means, for example a further gear, in order for the fluid to be conveyed.

The electric motor comprises at least one stator and one rotor. The electric motor is in particular an axial flow electric drive which comprises at least one stator and one rotor which are disposed so as to be mutually coaxial and beside one another along an axial direction.

The stator of the electric motor comprises in particular a soft magnetic material, for example a so-called "soft magnetic composite" (SMC), or a combination of electrical sheets and SMC. The coils of the stator comprise cores which are preferably produced from a compressed and baked soft magnetic material. The SMC material herein is not sintered. Rather, temperature-controlling takes place to a temperature below a melting temperature, this however being sufficient for the cores to permanently retain their geometry.

The rotor has in particular permanent magnets or else soft magnetic elements in recesses, for example. A permanently excited synchronous or brushless DC motor, BLDC for short, can preferably be formed using permanent magnets, while a reluctance motor as an electric motor can be achieved using soft magnetic elements, for example.

The construction of a stator, in particular while utilizing SMC, as well as further details also relating to a rotor are derived from WO 2016/066714 A1, for example, to which reference is made in the context of the disclosure of the present invention.

The electric motor has in particular an electric power input (thus a maximum drive output) of less than 100 Watt (nominal output), preferably of less than 50 Watt. In particular, the fluid is conveyed by the pump assembly at a conveying pressure of at most 10 bar.

The power input of the electric motor here takes place in particular for driving the rotor, the drive shaft, and the first drive means such that said components rotate about a common rotation axis at a rotating speed of more than "0" revolutions per minute. On the other hand, the power input of the electric motor takes place for heating the rotor. The power input for driving the rotor, the drive shaft, and the first drive means, and the power input for heating the rotor can in particular take place simultaneously or else in each case exclusively (thus a power input only for heating or only for driving).

In a first state, the electric motor is used (substantially) for driving the rotor and thus the drive shaft, or the first drive means, respectively. During the operation of the electric motor at a first drive output (the drive output can be considered to be the entire current power input of the electric motor, in particular a maximum drive output, thus the nominal output of the electric motor, for example) herein the rotor of the electric motor is heated by way of a first heating output which is at most 10%, in particular at most 5%, and preferably at most 1% of the first drive output (in particular of the maximum drive output).

The heating output transmitted to the rotor is in particular the electric output in Watt which is converted to heat by the electric resistances in the rotor.

A support for magnets which is disposed on the first drive shaft is in particular referred to as the rotor. In particular, the rotor is disposed so as to be spaced apart from the stator and also so as to be spaced apart from the first drive means along an axial direction such that a delimitation of the rotor in relation to other components is obvious.

In a second state the electric motor is driven at an electric second drive output, wherein heating of the rotor takes place by way of an electric second heating output; wherein the second heating output is at least 20%, in particular at least 50%, preferably at least 80%, of the second drive output.

It is thus presently proposed to convert to heat a variable, or else optionally a fixed, proportion of the electric output (first or second drive output) taken up by the electric motor. This heat is preferably to be generated by means of induction in the rotor. In particular, a first heating output and second heating output which (significantly) deviate from one another in value can be set in the case of the first and the second drive output being of identical value.

Besides the magnets, the rotor has in particular a support on which the magnets are disposed. In particular, the support serves specifically for converting the provided heating output to heat. The support is preferably embodied so as to contain iron, or to be ferritic, respectively, such that effective heating is possible.

The rotor by way of the heating output can reach a minimum temperature of 50 degrees Celsius, in particular of 100 degrees Celsius, in particular when the ambient temperature has a temperature which is lower than the minimum temperature of the rotor. The heating output is preferably controlled such that a specific maximum temperature, preferably 100 degrees Celsius, is not exceeded. The rotor is in particular rapidly heated to the maximum temperature and is supplied sufficient heating output such that the rotor maintains said maximum temperature despite transmitting heat onward to the fluid and other components.

The temperature of the rotor is in particular measured directly or indirectly and/or calculated or estimated, respectively, by means of the supplied heating output or a temperature model, respectively.

A rotating speed of the rotor and of the drive shaft is preferably variably adjustable by way of a first frequency signal of the electric motor. The rotating speed of the rotor varies in particular in a manner proportional to the first frequency signal of the electric motor.

In particular, an electric output (in Watt) for driving the rotor is transmitted from the electric motor by way of a first frequency signal of the electric motor, and a heating output for heating the rotor is transmitted by way of a second frequency signal, wherein the first frequency signal and the second frequency signal (in terms of the frequency) differ by a factor of at least 2 (in particular by a factor of 3 or even 5). The frequency of the second frequency signal is thus in particular at least twice (three times or five times) the frequency of the first frequency signal. Alternatively or additionally, a shape of the first frequency signal differs from a shape of the second frequency signal. In particular, the first frequency signal is sinusoidal, for example, while the second frequency signal is rectangular, for example.

The second frequency signal is in particular of such a high frequency that driving the rotor is not possible by way of the second frequency signal, for example by virtue of mass inertia or material characteristic values. The electric output transmitted by the second frequency signal is in particular almost exclusively converted to heat.

The first frequency signal and the second frequency signal are in particular transmitted in a temporally parallel manner. The first frequency signal and the second frequency signal can be transmitted so as to be mutually superimposed. It is thus in particular possible that the drive output taken up by the electric motor can be converted (in an almost arbitrary manner) simultaneously and/or determined in a proportional manner both to an electric output for driving the rotor as well as to an heating output for heating the rotor.

It is possible for the first frequency signal and the second frequency signal to be transmitted (exclusively) so as to be temporarily offset to one another.

The electric motor in the second state is preferably driven at a second drive output (thus the power input of the electric motor) which is transmitted (substantially) exclusively as a second heating output for heating the rotor. In particular, no electric output is used for driving the rotor herein. The rotating speed of the rotor is in particular "0" revolutions per minute, despite the power input of the electric motor (second drive output).

Furthermore proposed is a pump assembly, comprising at least a first drive means for conveying a fluid and an electric motor for driving the first drive means. The electric motor comprises at least one stator as well as one rotor, wherein the rotor by way of a drive shaft is connected at least to the first drive means. The pump assembly has a control unit which is suitable and specified for carrying out the method described above such that an electric output for driving the rotor and a heating output for heating the rotor are able to be controlled in an at least partially mutually independent manner by the control unit.

The explanations pertaining to the method likewise apply to the pump assembly and vice versa.

The electric motor is preferably an axial flow motor, wherein the rotor and the stator are disposed beside one another along an axial direction. The drive shaft extends in particular along the axial direction. The rotor, the stator, the drive shaft and the first drive means are preferably disposed so as to be mutually coaxial.

In particular, the stator is disposed so as to be separated in a fluid-tight (optionally also a gas-tight) manner from the rotor.

According to one preferred design embodiment, the first drive means is disposed in a first housing, wherein the first housing has a fluid inlet and a fluid outlet, and the rotor along an axial direction is furthermore disposed outside the first housing. The drive shaft, proceeding from the rotor, extends in particular along the axial direction into the first housing, wherein the first drive means and optionally further drive means is/are disposed within the first housing.

The rotor on an end side facing the first housing preferably has a structure which is suitable for conveying a fluid. This structure serves in particular for conveying a fluid which is situated in a gap between the first housing and the end side of the rotor. This structure herein is in particular not only a surface roughness but actually a consciously shaped structure which can be described in geometric terms and which conveys the fluid as a result of the rotation of the rotor.

It is thus in particular enabled that the fluid contacting the rotor, or optionally surrounding the rotor, respectively, is heated by the rotor on the one hand, and conveyed on the other hand, such that additional fluid reaches the proximity of the rotor, thus guaranteeing an efficient thermal transfer from the rotor to the fluid. The heat generated in the rotor is transmitted to the fluid which is in contact with the rotor and to the fluid which is disposed in the first housing by way of the rotor, or as a result of thermal conduction through the drive shaft, respectively.

Furthermore proposed is a tank assembly, comprising at least a tank for storing a fluid as well as a pump assembly described above, wherein at least the rotor and the drive means are disposed within the tank, wherein the stator is disposed in a second housing which is fluid-tight in relation to the fluid stored in the tank. The stator is thus in particular disposed so as to be separate from the fluid stored in the tank, optionally in a second housing which itself is in particular disposed in the tank, or else optionally outside the tank.

According to one preferred design embodiment, the first drive means is disposed in a first housing, wherein the first housing is disposed in the tank and has a fluid inlet and a fluid outlet. The fluid stored in the tank is able to be conveyed by the first drive means from the tank via the fluid inlet toward the fluid outlet.

The fluid is in particular retrieved from the tank by way of the fluid inlet and by way of the fluid outlet is in particular conveyed into a line which conveys the fluid out of the tank and toward an additive feeding unit, for example. The fluid, in particular a urea/water solution, is preferably conveyed into an exhaust gas line by way of the additive feeding unit.

The fluid can preferably also be conveyed back into the tank by way of the fluid inlet.

The rotor, on an end side facing the first housing, has in particular a structure which during a rotation of the rotor is suitable for conveying the fluid stored in the tank (and not the fluid situated in the first housing).

Furthermore proposed is the use of a pump assembly proposed above for conveying a urea/water solution as the fluid by the first drive means. Furthermore proposed is the use of a tank assembly proposed above for heating and holding a urea/water solution as the fluid in a motor vehicle.

The explanations pertaining to the method likewise applied to the pump assembly, the tank assembly, and the proposed uses, and vice versa.

Proposed is thus a method in which an electric motor is used for driving a rotor (thus for carrying out a rotating movement) on the one hand, and for the targeted heating of the rotor by means of induction on the other hand. The rotor herein can also be exclusively heated and not driven at all. This is particularly advantageous for fluids which can freeze such as, for example, urea/water solutions which have a freezing point of approx. −11 degrees Celsius. A fluid stored in a tank can thus be thawed by the rotor on the one hand, and then be increasingly conveyed by said rotor.

A fluid inlet into the first housing is in particular disposed in the proximity of the rotor, for example, or even in the gap between the rotor and the first housing such that the fluid which has been thawed at a particularly early stage can already be conveyed here by the first drive means.

A particularly high heating output can thus be made available by the electric motor, wherein the heating output can in particular be in the order of the nominal output.

Furthermore proposed is an electric motor, comprising at least one stator as well as one rotor. The electric motor is in particular used for the method proposed here, the pump assembly, the tank assembly, and or/the use. The electric motor is in particular used in a pump assembly comprising at least a first drive means for conveying a fluid and the electric motor for driving the first drive means. The electric motor comprises at least one stator as well as one rotor, wherein the rotor by way of a drive shaft is connected at least to the first drive means. The pump assembly has a control unit which is in particular suitable and specified for carrying out the method described here such that an electric output for driving the rotor and a heating output for heating the rotor are able to be controlled in an at least partially mutually independent manner by the control unit.

The electric motor is in particular a so-called axial flow motor, wherein the rotor and the stator are disposed beside one another along an axial direction. The stator has a multiplicity of cores which along a circumferential direction are disposed beside one another on a common first diameter and are in each case surrounded by one coil. The rotor has a multiplicity of magnets which along the circumferential direction are disposed beside one another on a common second diameter (identical to or different from the first diameter) on a support. Each magnet in the circumferential direction extends across a first angular range, wherein the magnets are disposed so as to be mutually spaced apart by a second angular range, wherein the second angular range is at least 30%, in particular at least 50%, preferably at least 80%, particularly preferably at least 100%, of the first angular range.

The second angular range is preferably formed by the support, wherein the support is heatable by the stator by means of induction.

The magnets are in particular disposed in recesses of the support such that the magnets and the support on the end side of the rotor that faces the stator preferably terminate so as to be flush with one another.

The explanations pertaining to the method, the pump assembly, the tank assembly, and the use likewise apply to the electric motor and vice versa.

By way of precaution, it is pointed out that the numerical words used here ("first", "second", "third", . . . ) serve primarily (only) for distinction between several similar objects, dimensions or processes, that is to say in particular they do not imperatively predefine a dependency and/or sequence of said objects, dimensions or processes. If a dependency and/or sequence is necessary, this will be explicitly stated here, or will emerge in an obvious manner to a person skilled in the art from a study of the design embodiment being specifically described.

The invention and the technical field will be discussed in more detail below by means of the figures. It is pointed out that the invention is not intended to be restricted by the exemplary embodiments shown. In particular, unless explicitly presented otherwise, it is also possible for partial aspects of the substantive matter discussed in the figures to be extracted and combined with other constituent parts and knowledge from the present description and/or figures. The same reference signs are used to denote identical objects, such that, where appropriate, explanations from other figures can be taken into consideration in a supplementary manner. In the figures, in each case schematically.

Figure 1:
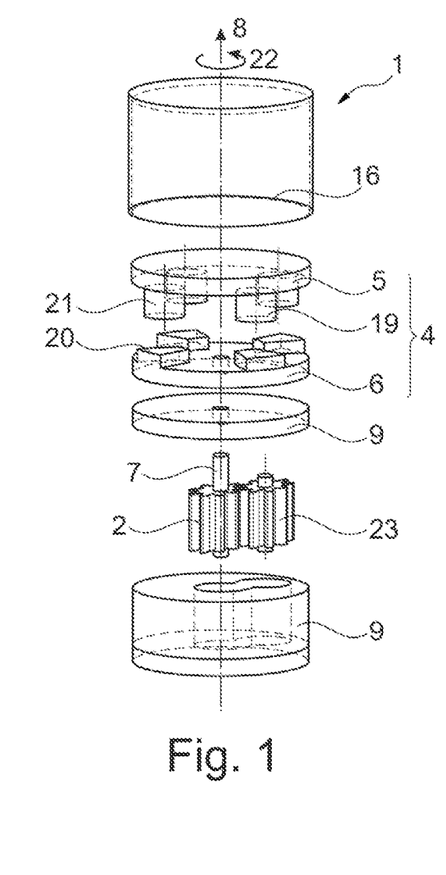
FIG. 1: shows a pump assembly in a lateral view in a perspective view in an exploded illustration.
Figure 2:
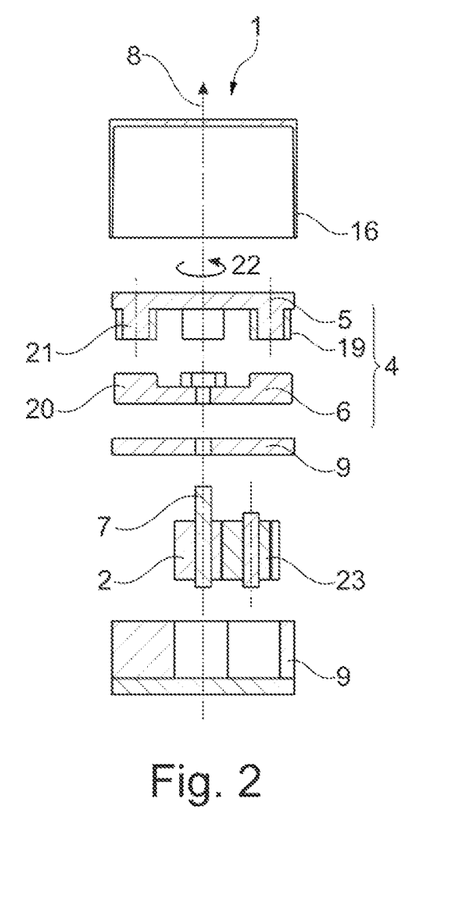
FIG. 2: shows the pump assembly according to FIG. 1 in a lateral sectional view in an exploded illustration.
Figure 3:
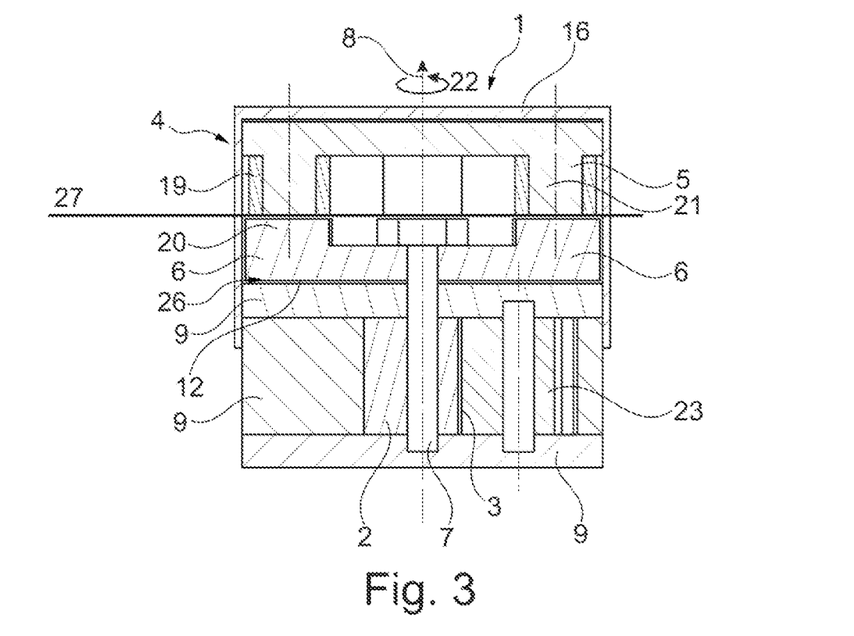
FIG. 3: shows the pump assembly according to FIGS. 1 and 2 in a lateral sectional view.
Figure 4:
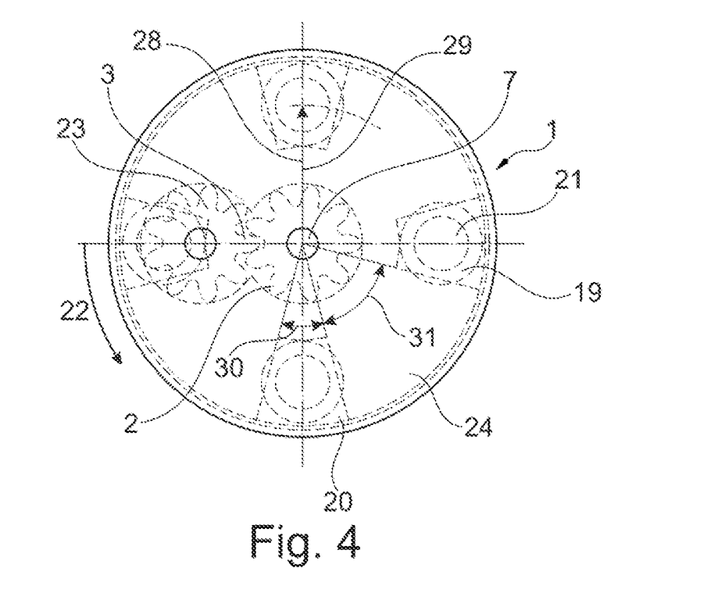
FIG. 4: shows the pump assembly according to FIGS. 1 to 3 in a view along the axial direction.
Figure 5:
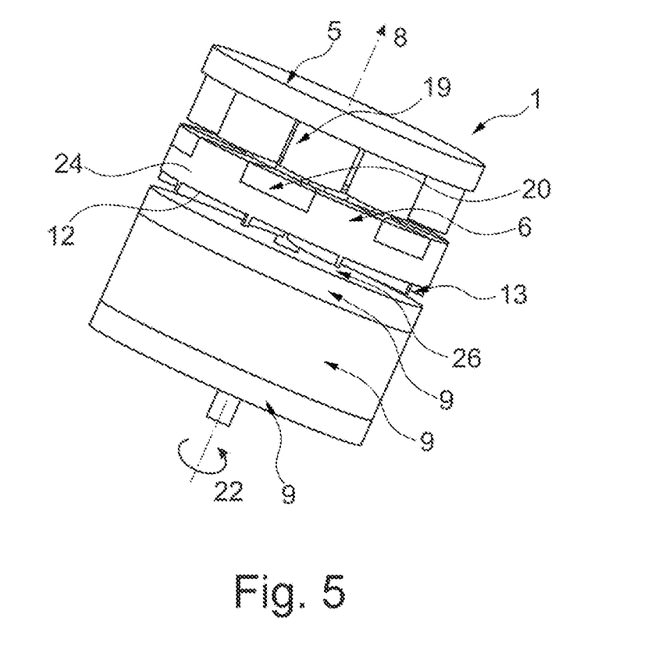
FIG. 5: shows the pump assembly according to FIGS. 1 to 4 in a perspective view.

FIG. 1 shows a pump assembly 1 in a lateral view in a perspective view in an exploded illustration. FIG. 2 shows the pump assembly 1 according to FIG. 1 in a lateral sectional view in an exploded illustration. FIG. 3 shows the pump assembly 1 according to FIGS. 1 and 2 in a lateral sectional view. FIG. 4 shows the pump assembly 1 according to FIGS. 1 to 3 in a view along the axial direction 8. FIG. 5 shows the pump assembly 1 according to FIGS. 1 to 4 in a perspective view. FIGS. 1 to 5 will be collectively described hereunder.

The pump assembly 1 comprises a first drive means 2 for conveying a fluid 3, and an electric motor 4 for driving the first drive means 2. The electric motor 4 comprises a stator 5 as well as a rotor 6, wherein the rotor 6 by way of a drive shaft 7 is connected to the first drive means 2.

The electric motor 4 is an axial flow motor, wherein the rotor 6 and the stator 5 are disposed beside one another along an axial direction 8. The drive shaft 7 extends along the axial direction 8. The rotor 6, the stator 5, the drive shaft 7, and the first drive means 2 are disposed so as to be mutually coaxial.

The stator 5 is disposed so as to be separated in a fluid-tight manner from the rotor 6 (here indicated by a tank wall 27; see FIG. 3).

The first drive means 2 (here, a gear) is disposed in a first housing 9. The rotor 6 along the axial direction 8 is disposed outside the first housing 9. The drive shaft 7, proceeding from the rotor 6, extends along the axial direction 8 into the first housing 9, wherein the first drive means 2 and a second drive means 23 are disposed within the first housing 9.

The rotor 6 on an end side 12 facing the first housing 9 has a structure 13 which is suitable for conveying a fluid 3. This structure 13 serves for conveying a fluid 3 which is situated in a gap 26 between the first housing 9 and the end side 12 of the rotor 6. This structure 13 herein is not only a surface roughness but actually a consciously shaped structure 13 which can be described in geometric terms and which conveys the fluid 3 in the circumferential direction 22 as a result of the rotation of the rotor 6.

The first drive means 3 here is a first gear rotor. Said gear rotor is embodied as a component part of a gear pump, wherein the gear pump is constructed as an external gear pump.

The stator 5 of the electric motor 4 has cores 21 which are surrounded by coils 19. The rotor 6 has magnets 20 which are disposed on a support 24. The support 24 is heated by the heating output such that a fluid 3 surrounding the rotor 6 is heated and optionally thawed. A fluid inlet 10, or a fluid outlet, respectively, which is not shown here, can in particular be disposed in this case in the gap 26, thus between the end side 12 and the first housing 9, on the first housing 9.

The pump assembly 1 according to FIGS. 1 to 3 is illustrated in a view along the axial direction 8 in FIG. 4, wherein the disposal of the magnets 20 and of the coils 19 as well as of the cores 21 can also be seen. The stator 5 has a multiplicity of cores 21 which along a circumferential direction 22 are disposed beside one another on a common first diameter 28 and are in each case surrounded by one coil 19. The rotor 6 has a multiplicity of magnets 20 which along the circumferential direction 22 are disposed beside one another on a common second diameter 29 (the latter here corresponding to the first diameter 28) on a support 24, or embedded in the latter, respectively. Each magnet 20 in the circumferential direction 22 extends across a first angular range 30, wherein the magnets 20 are disposed so as to be mutually spaced apart by a second angular range 31, wherein the second angular range 31 here is larger than the first angular range 30. The second angular range 31 thus is more than 100% of the first angular range 30.

It is illustrated in FIG. 5 that the magnets 20 are disposed in recesses of the support 24 such that the magnets 20 and the support 24 on the end side of the rotor 6 that faces the stator 4 terminate so as to be flush with one another.

Figure 6:
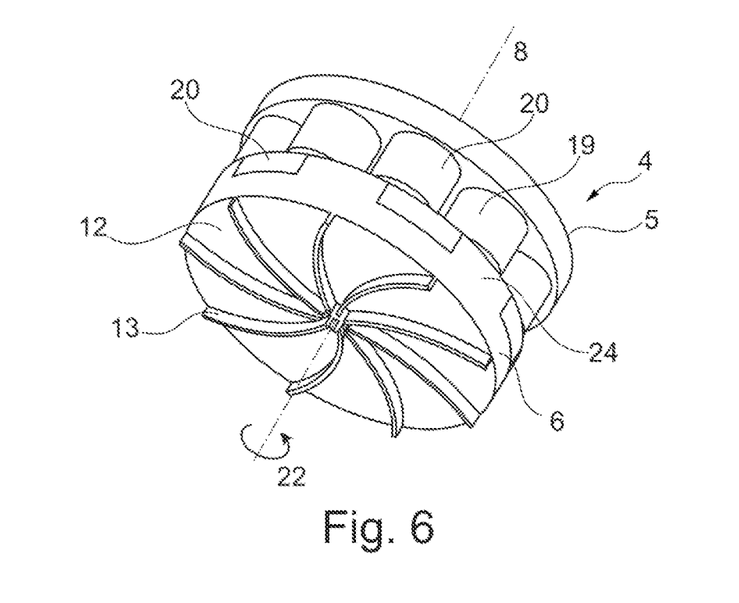
FIG. 6: shows the electric motor of the pump assembly according to FIGS. 1 to 5 in a perspective view.

FIG. 6 shows the electric motor 4 of the pump assembly 1 according to FIGS. 1 to 5 in a perspective view. The electric motor 4 is an axial flow motor, wherein the rotor 6 and the stator 5 are disposed beside one another along an axial direction 8. The stator 5 of the electric motor 4 has cores 21 surrounded by coils 19. The rotor 6 has magnets 20 which on a support 24 are disposed in recesses of the support 24. The rotor 6 on an end side 12 facing the first housing 9 has a structure 13 which is suitable for conveying a fluid 3. This structure 13 serves for conveying a fluid 3 which is situated in a gap 26 between the first housing 9 and the end side 12 of the rotor 6.

Figure 7:
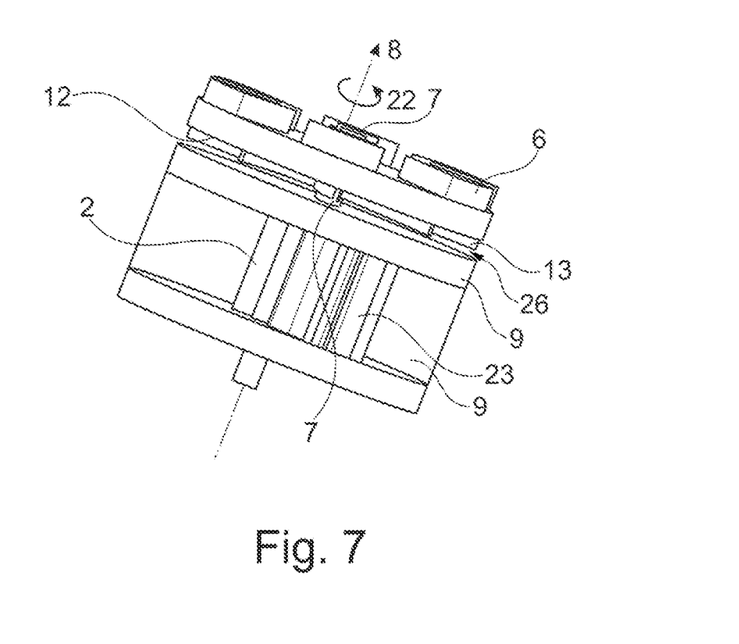
FIG. 7: shows the rotor and the first drive means of the pump assembly according to FIGS. 1 to 6 in a perspective view.

FIG. 7 shows the rotor 6 and the first drive means 2 as well as the second drive means 23 of the pump assembly 1 according to FIGS. 1 and 2 in a perspective view. The rotor 6 on an end side 12 facing the first housing 9 has a structure 13 which is suitable for conveying a fluid 3. This structure 13 serves for conveying a fluid 3 which is situated in a gap 26 between the first housing 9 and the end side 12 of the rotor 6. The first drive means 2 and the second drive means 23 (both gear rotors) are disposed in a first housing 9. The rotor 6 along the axial direction 8 is disposed outside the first housing 9. The drive shaft 7, proceeding from the rotor 6, extends along the axial direction 8 into the first housing 9, wherein the first drive means 2 and a second drive means 23 are disposed within the first housing 9.

Figure 8:
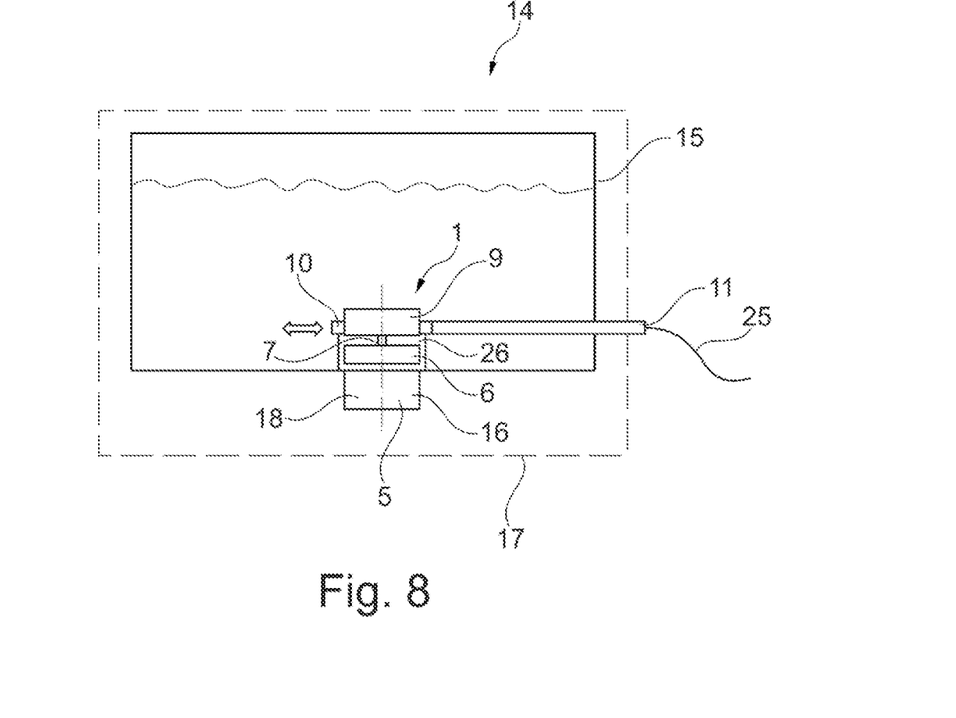
FIG. 8: shows a tank assembly in a lateral sectional view.

FIG. 8 shows a tank assembly 14 in a lateral sectional view. The tank assembly 14 is disposed in a motor vehicle 17 and comprises a tank 15 for storing a fluid 3 as well as a pump assembly 1. The pump assembly 1 comprises a first drive means 2 for conveying a fluid 3 and an electric motor 4 for driving the first drive means 2. The electric motor 4 comprises a stator 5 as well as a rotor 6, wherein the rotor 6 by way of a drive shaft 7 is connected to the first drive means 2. The pump assembly 1 has a control unit 18 which is suitable and specified for carrying out the method described above such that an electric output for driving the rotor 6 and a heating output for heating the rotor 6 are able to be controlled in an at least partially mutually independent manner by the control unit 18.

The rotor 6 and the drive means 2 are disposed within the tank 15, wherein the stator 5 is disposed in a second housing 16 which is fluid-tight in relation to the fluid 3 stored in the tank 15. The stator 6 is thus disposed so as to be separate from the fluid 3 stored in the tank 15, and so as to be in the second housing 16 which is disposed outside the tank 15.

The first drive means 2 is disposed in a first housing 9, wherein the first housing 9 is disposed in the tank 15 and has a fluid inlet 10 and a fluid outlet 11. The fluid 3 stored in the tank 15 is able to be conveyed by the first drive means 2 from the tank 15 via the fluid inlet 10 toward the fluid outlet 11.

The fluid 3 is retrieved from the tank 15 by way of the fluid inlet 10, and by way of the fluid outlet 11 conveyed into a line 25 which conveys the fluid 3 from the tank 15 and toward an additive feeding unit, for example. The fluid 3, in particular a urea/water solution, is conveyed into an exhaust gas line (not shown here) by way of the additive feeding unit.

As can be seen, the fluid 3 can also be conveyed back into the tank 15 by way of the fluid inlet 10.

A method in which an electric motor 4 is used for driving a rotor 6 (thus for carrying out a rotating movement) on the one hand, and for the targeted heating of the rotor 6 on the other hand is proposed here. The rotor 6 can also be exclusively heated and not at all be driven herein. This is particularly advantageous for fluids 3 which can freeze such as, for example, urea/water solutions which have a freezing point of approx. −11 degrees Celsius. A fluid 3 stored in a tank 15 can thus be thawed by the rotor 6 and then be increasingly conveyed by said rotor 6.

A fluid inlet 10 into the first housing 9 is in particular disposed in the proximity of the rotor 6, for example, or even in the gap 26 between the rotor 6 and the first housing 9 such that the fluid 3 thawed at a particularly early stage can here already be conveyed by the first drive means 2.

A particularly large heating output can thus be made available by the electric motor 4, wherein the heating output can in particular be in the order of the nominal output of the electric motor 4.

LIST OF REFERENCE SIGNS

1 Pump assembly
2 First drive means
3 Fluid
4 Electric motor
5 Stator
6 Rotor
7 Drive shaft
8 Axial direction
9 First housing
10 Fluid inlet
11 Fluid outlet
12 End side
13 Structure
14 Tank assembly
15 Tank
16 Second housing
17 Motor vehicle
18 Control unit
19 Coil
20 Magnet
21 Core
22 Circumferential direction
23 Second drive means
24 Support
25 Line
26 Gap
27 Tank wall
28 First diameter
29 Second diameter
30 First angular range
31 Second angular range

The invention claimed is:

1. A method for operating a pump assembly, wherein the pump assembly has at least one first drive means for conveying a fluid and an electric motor for driving the first drive means, wherein the electric motor comprises at least one stator as well as one rotor, wherein the rotor by way of a drive shaft is connected at least to the first drive means, and wherein the pump assembly further has a control unit, the method comprising:
    driving the rotor using an electric output controlled by the control unit; and
    heating the rotor using a heating output controlled by the control unit, in which the rotor is inductively heated by the electric motor by an alternating magnetic field generating eddy currents in a material of the rotor;
    wherein the electric output for driving the rotor and the heating output for heating the rotor by induction are controlled in an at least partially mutually independent manner by the control unit allowing for independent control signals.

2. The method as claimed in claim 1, wherein the method comprises at least the following steps:
    a) operating the pump assembly in a first state in which the electric motor is driven at an electric first drive output, wherein heating of the rotor takes place by way of an electric first heating output which is at most 10% of the first drive output;
    b) operating the pump assembly in a second state in which the electric motor is driven at an electric second drive output, wherein heating of the rotor takes place by way of an electric second heating output which is at least 20% of the second drive output.

3. The method as claimed in claim 1, wherein a rotating speed of the rotor and of the drive shaft is variably adjustable by way of a first frequency signal of the electric motor.

4. The method as claimed in claim 1, wherein the electric output for driving the rotor is transmitted from the electric motor by way of a first frequency signal of the electric motor, and the heating output for heating the rotor is transmitted by way of a second frequency signal, wherein the first frequency signal and the second frequency signal differ by a factor of at least 2, or a shape of the first frequency signal and of the second frequency signal differ from one another.

5. The method as claimed in claim 4, wherein the first frequency signal and the second frequency signal are transmitted in a temporally parallel manner.

6. The method as claimed in claim 1, wherein the electric motor is driven at an electric second drive output which is transmitted exclusively as a second heating output for heating the rotor.

7. A pump assembly comprising at least a first drive means for conveying a fluid and an electric motor for driving the first drive means, wherein the electric motor comprises at least one stator as well as one rotor, wherein the rotor by way of a drive shaft is connected at least to the first drive means, wherein the pump assembly has a control unit which is suitable and specified for carrying out the method as claimed in claim 1 such that the electric output for driving the rotor and the heating output for heating the rotor are able to be controlled in an at least partially mutually independent manner by the control unit.

8. The pump assembly as claimed in claim 7, wherein the electric motor is an axial flux motor, and wherein the rotor and the stator are disposed beside one another along an axial direction.

9. The pump assembly as claimed in claim 8, wherein the stator is disposed so as to be separated in a fluid-tight manner from the rotor.

10. The pump assembly as claimed in claim 7, wherein the first drive means is disposed in a first housing, wherein the first housing has a fluid inlet and a fluid outlet, wherein the rotor along an axial direction is disposed outside the first housing.

11. The pump assembly as claimed in claim 10, wherein the rotor on an end side facing the first housing has a structure which is suitable for conveying a fluid.

12. A tank assembly, comprising at least a tank for storing a fluid as well as a pump assembly as claimed in claim 7, wherein at least the rotor and the first drive means are disposed within the tank, wherein the stator is disposed in a second housing which is fluid-tight in relation to the fluid stored in the tank.

13. The tank assembly of claim 12, in which the tank assembly heats and holds a urea/water solution as the fluid in a motor vehicle.

14. The method of claim 1, wherein, when heating by induction, heat is created directly in the rotor and the heat is not transmitted into the rotor by thermal conduction.

15. The method of claim 1, wherein a urea/water solution as the fluid is conveyed by the first drive means.

16. The method of claim 1, wherein the rotor has a multiplicity of magnets embedded in a material of a support of the rotor; and     wherein, during heating the rotor using the heating output controlled by the control unit, in which the rotor is inductively heated by the electric motor, the material of the support of the rotor is inductively heated.

\* \* \* \* \*